United States Patent Office 2,695,880
Patented Nov. 30, 1954

2,695,880

TELOMER GREASES

Anthony F. Benning, Woodstown, N. J., and Frederick B. Hill, Jr., New Castle, Del., assignors to E. I. du Pont de Nemours & Company, Wilmington, Del., a corporation of Delaware No Drawing. Application February 21, 1952,
Serial No. 272,906

7 Claims. (Cl. 252—58)

This invention relates to oils and greases which retain their rheological properties under extreme conditions of temperature, and more particularly to certain polyhalocarbons which have been treated to thicken them and to improve their stability and lubricating properties over a wide temperature range.

One of the outstanding problems facing lubrication engineers is the lack of lubricants which have a relatively constant viscosity or plasticity over a wide range of temperature. Many greases are satisfactory at about room temperature, but become too thick at about 0° C. or below. On the other hand, these greases become too thin at temperatures above 100° C.

Some greases, e. g., completely fluorinated hydrocarbon oils, are valuable in that they are extremely resistant to corrosive conditions due to their chemical inertness. However, such oils have the disadvantage that their viscosity index is unsatisfactory, that is, their viscosity and plasticity decrease rapidly at high temperatures.

The primary object of this invention is the provision of polyhalocarbon greases stabilized against changes in viscosity and plasticity over wide variations in temperature. Another object is the provision of an economical method for producing thickened and stabilized polyhalocarbon oils and greases. Other objects will appear as the description of the invention proceeds.

These objects are accomplished by mixing (1) 70% to 90% by weight of a telomer oil consisting of the telomers of monochlorotrifluoroethylene or intertelomers of monochlorotrifluoroethylene and tetrafluoroethylene with chloroform or carbon tetrachloride boiling above 70° C. at 10 mm. Hg with (2) 10% to 30% by weight of a telomer thickener consisting of a telomer of tetrafluoroethylene with chloroform or carbon tetrachloride. The telomer of tetrafluoroethylene has a molecular weight within the range of 2500 to about 4000. The improved oils and greases are prepared by mixing the first telomer or intertelomer, described more fully hereinafter, into a suspension of the second telomer in an excess of telogen (chloroform or carbon tetrachloride), after which the latter is removed, preferably under vacuum at a temperature of about 20° to 100° C.

The oily telomers which the present invention may use as starting materials are those of chlorotrifluoroethylene or intertelomers of tetrafluoroethylene and chlorotrifluoroethylene with chloroform or carbon tetrachloride. These polyhalogenated compounds and method for preparing them are described in Ind. & Eng. Chem. 39, 290 to 354 (1947). They are obtained as complex mixtures from which the low boiling components are removed by distillation, and will be referred to as "telomer oils". The tetrafluoroethylene telomers are fully described in British Patent No. 583,874. In this invention, the term "telomer thickener" refers to those described in this patent. The term "telogen" may be defined as a non-polymerizable material (e. g., chloroform and carbon tetrachloride), which is used as a reagent during the telomerization or low polymerization of the halogenated ethylene in which it acts as a chain stopper. The exact amount of telogen is not critical, but usually about 10 parts per part of tetrafluoroethylene or its equivalent is used.

The preferred compositions are greases containing about 75% by weight of the chlorotrifluoroethylene-chloroform telomer stabilized by after-treatment with a fluorinating agent such as $CoF_3$, $AgF_2$ and $MnF_4$, followed by fractional distillation to yield an oil having a boiling range of 100° to 220° C. at 1 mm. Hg, and 25% by weight of tetrafluoroethylene-carbon tetrachloride telomer having an average molecular weight of about 3000.

As suggested above, a preferred embodiment of the invention involves fluorinating the chloroform-chlorotrifluoroethylene telomer by an after-treatment with a fluorinating agent, for example $CoF_3$. This is accomplished by the procedure described in the literature reference referred to above. By this reaction, the terminal Cl atoms are replaced by F atoms. This increases the chemical stability of the telomer and reduces its boiling range.

The compositions of this invention are grease-like materials which may vary considerably in consistency and appearance. Those based on chlorotrifluoroethylene telomers are smooth non-tacky greases. In general, the compositions are translucent and opalescent, and vary in color from a light straw to gray.

The greases have been tested for consistency by the ASTM micro penetration test (ASTM Bulletin No. 147 for August, 1947, pp. 81–85). This test involves an empirical measurement of the consistency of small samples of grease in which the penetration values are the distance in tenths of a millimeter to which the micro cone will penetrate the grease in 5 sec. at a specified temperature such as 77° F., followed by converting these measured values to standard penetration values from a curve.

The telomer oil is mixed into the chloroform or carbon tetrachloride dispersion of the telomer thickener. This can be done at any convenient rate and temperature, usually between room temperature (20° to 30° C.) and the boiling point of the telogen (60° to 80° C.), although lower temperatures, even down to 0° C. are operable. Sometimes it is more convenient because of volume limitations of the vessel to remove a portion of the telogen before introducing the telomer oil. A substantial portion of the telogen must be left in the mixing vessel to maintain the dispersion of the thickener. Usually this amount is about 4 to 5 parts, based on the telomer thickener. The removal of the excess telogen can be done by distillation, in which case the telomer oil can be mixed into the telomer thickener dispersion at the temperature reached at the end of the distillation.

After complete mixing, the remaining excess telogen is removed by distillation while the mixture is still under agitation. The distillation may be at atmospheric or reduced pressure, and in some cases it may be necessary to raise the temperature of the mixture to as high as 150° to 200° C. to ensure removal of the telogen from the thick grease.

The following examples are given by way of illustration only, since many variations are possible, and no limitations are intended except as defined in the appended claims.

Examples I and II illustrate embodiments of the invention in which the telomer oils are intertelomers of monochlorotrifluoroethylene and tetrafluoroethylene. These interpolymers may vary considerably in the ratio of the halogenated ethylene units, but the preferred chloroform or carbon tetrachloride intertelomers contain between 70% to 80% of monochlorotrifluoroethylene units, and from 20% to 30% of tetrafluoroethylene units.

Example I

The chlorofluorocarbon telomer oil used as the starting material of this example was prepared by first telomerizing one part by weight of a mixture of chlorotrifluoroethylene and tetrafluoroethylene in the ratio of 7:3 parts by weight with 9 parts of chloroform. Reaction was carried out in the presence of 5% by weight of benzoyl peroxide (based on the total reactants) at 100° C. for 2 hours as outlined in the article beginning on p. 333 of the Ind. & Eng. Chem. reference cited above. The material boiling below 105° C. at 10 mm. was removed by distillation. The product was a chlorofluorocarbon semi-solid oil at room temperature, and flowed at 80° C.

The thickening agent was prepared from 1 part by weight of tetrafluoroethylene and 9 parts by weight of chloroform, which were heated for 16 hours at 70° C. in the presence of 5% by weight of benzoyl peroxide (based on the weight of the total reactants). The telomer had an average molecular weight of about 2500.

The grease was prepared by stirring 9 parts of the chlorofluorocarbon telomer oil into 10 parts of the relatively dilute chloroform disperson of the telomer. The chloroform was removed by evaporation with agitation on a steam bath, giving a grease containing 10% of thickener. The product was a white milky-appearing substance having a less sticky and more grease-like consistency than the starting materials. The grease had a micro penetration value of 152 and 222 at 77° F. and 150° F. respectively. It was useful over a temperature range of 0° to 80° C.

*Example II*

A telomer oil was prepared from an 8 to 2 mixture of chlorotrifluoroethylene and tetrafluoroethylene in the same manner as described in Example I. The fraction boiling above 105° C. at 10 mm. was collected and was a semi-solid at room temperature and fluid at 80° C. The telomer thickener was made from six patrs of tetrafluoroethylene and 52 parts of carbon tetrachloride, using 2 parts of chloroform to dissolve 0.3 part of benzoyl peroxide catalyst. The reaction was carried out at 70° C. for 18 hours, giving a waxy solid containing 4.1% chlorine, and having an average molecular weight of about 3450. This sample had an extrusion time of 90 sec., which was the time measured for a one-gram sample under a pressure of 110 lbs. per square inch to be extruded at 250° C. through an orifice having a diameter of .052 inch. The telomer oil was thickened by mixing 7 parts of the telomer oil with 30 parts of the dilute telomer thickener dispersion in the same way as described in Example I, except that the carbon tetrachloride was removed by heating at 105° C. The product was a grease having high chemical resistance and good lubricating properties at temperatures over the range of 100° to 150° C. It was a sticky grease at room temperature and had micro penetration values of 148 and 180 at 77° F. and 150° F. respectively.

*Example III*

Another grease was prepared by treating a mixture of two chlorofluorocarbon telomer oils. The procedure for preparing the grease was the same as used in Example II. The ingredients were (*a*) 60 parts of the chlorofluorocarbon telomer oil of Example II and (*b*) 20 parts of a commercial chlorofluorocarbon telomer oil described as a chloroform telomer of chlorotrifluoroethylene stabilized by fluorination with CoF3 by the process described on pages 333 to 337 of the literature reference cited above, followed by fractional distillation to give an oil having a boiling range of 100° to 220° C. at 1 mm. and (*c*) 20 parts of the telomer thickener of Example II (dry solids basis). This grease had excellent lubricating properties even at very low temperatures, and was found to be useful as low as −40° C. Its micro penetration values were 210 and 280 at 77° F. and 150° F. respectively.

*Example IV*

The grease was prepared by the procedure of Example II. using 75 parts of the commercial chlorofluorocarbon telomer oil (boiling range 100° to 220° C. at 1 mm.) of Example III and 25 parts of the telomer thickener of Example II (dry solids basis). The product was a smooth, non-tacky, light gray grease having useful lubricating properties over the range of −20° C. to +200° C. Because of the viscosity index of the grease, complete removal of the carbon tetrachloride was accomplished by heating with agitation at 200° C., although removal could be accomplished satisfactorily by heating to lower temperatures with reduced pressures. The micro penetration values for this grease were 200 and 223 at 77° F. and 150° F. respectively.

It will be apparent that the amount of telomer thickener may vary over a relatively wide range. If from 4% to 5% is used, the products will be thickened oils rather than greases, and have only limited uses. On the other hand, if amounts of thickener greater than 30% are used, the products are too hard for use as greases. The preferred range, therefore, lies between about 10% to 30% by weight of the telomer thickener. The thickened oils and greases so prepared have exceptional chemical resistance and lubricating properties over a very wide temperature range because of their high viscosity index.

The compositions of this invention have the advantage that they are smooth, non-tacky greases. It is possible to prepare some such as those disclosed in Example IV which maintain their consistency and lubricating properties over an extremely wide range of temperature. Another advantage is that greases with various temperature and viscosity characteristics can be made to fit any particular requirements with respect to consistency.

In the preparation of polymers heretofore used as lubricants, variations in the molecular weight are very difficult to control, whereas in the present invention, the molecular weight of the starting material is not particularly critical, and the properties of the thickened oil or grease can be determined fairly accurately by the amount of telomer thickener added.

It will be apparent that many widely different embodiments of this invention may be made without departing from the spirit and scope thereof, and therefore, it is not intended to be limited except as indicated in the appended claims.

We claim:

1. A grease having a high viscosity index comprising an intimate homogeneous mixture of (1) 70% to 90% by weight of a telomer oil boiling above 70° C. at 10 mm., selected from the class consisting of chloroform telomers of monochlorotrifluoroethylene, carbon tetrachloride telomers of monochlorotrifluoroethylene, chloroform intertelomers of monochlorotrifluoroethylene and tetrafluoroethylene, carbon tetrachloride intertelomers of monochlorotrifluoroethylene and tetrafluoroethylene, and mixtures of the said telomers, the terminal halogen of the telomer oil being selected from the group consisting of chlorine and fluorine; and (2) 10% to 30% by weight of a telomer thickener having a molecular weight of between about 2500 and 4000 selected from the class of chloroform telomers of tetrafluoroethylene and carbon tetrachloride telomers of tetrafluoroethylene.

2. A new composition of matter comprising in proportion 70 to 90 parts of a chloroform telomer of monochlorotrifluoroethylene stabilized by fluorination and boiling from 100° to 220° C. at 1 mm., and 10 to 30 parts of a carbon tetrachloride telomer of tetrafluoroethylene having an average molecular weight of about 2500 to 4000.

3. A product containing 75% of chloroform telomer of monochlorotrifluoroethylene stabilized by fluorination and boiling from 100° to 220° C. at 1 mm., and 25% of carbon tetrachloride telomer of tetrafluoroethylene having an average molecular weight of about 3000.

4. A new composition of matter comprising in proportion from 70 to 90 parts of a chloroform intertelomer of 70% to 80% monochlorotrifluoroethylene and 20% to 30% tetrafluoroethylene and 10 to 30 parts of a chloroform telomer of tetrafluoroethylene having an average molecular weight of about 2500 to 4000.

5. The process of preparing greases which retain their rheological properties under extreme conditions of temperature which comprises mixing (1) from 70% to 90% by weight of a telomer boiling above 70° C. at 10 mm., selected from the class consisting of chloroform telomers of monochlorotrifluoroethylene, carbon tetrachloride telomers of monochlorotrifluoroethylene, chloroform intertelomers of monochlorotrifluoroethylene and tetrafluoroethylene, and carbon tetrachloride intertelomers of monochlorotrifluoroethylene and tetrafluoroethylene with (2) 10% to 30% by weight of a telomer having a molecular weight of about 2500 to 4000, selected from the class of chloroform telomers of tetrafluoroethylene and carbon tetrachloride telomers of tetrafluoroethylene, the latter telomer being suspended in at least 4 to 5 times its weight of its parent telogen, and then distilling off the telogen.

6. The process of preparing greases which retain their rheological properties under extreme conditions of temperature, which comprises mixing (1) from 70% to 90% of a chloroform telomer of monochlorotrifluoroethylene stabilized by fluorination with cobalt trifluoride and boiling from 100° to 220° C. at 1 mm., with (2) 10% to 30% of a carbon tetrachloride telomer of tetrafluoroethylene having an average molecular weight of about 2500 to 4000, the latter telomer being suspended in at least 4 to 5 times its weight of carbon tetrachloride and then distilling off the carbon tetrachloride.

7. The process of preparing greases which retain their rheological properties under extreme conditions of temperature, which comprises mixing (1) from 70% to 90% of a chloroform intertelomer of 70% to 80% monochlorotrifluoroethylene and 20% to 30% tetrafluoroethylene with (2) 10 to 30 parts by weight of a chloroform telomer of tetrafluoroethylene having an average molecular weight of about 2500 to 4000, the latter telomer being suspended in at least 4 to 5 times its weight of chloroform and then distilling off the chloroform.

References Cited in the file of this patent

UNITED STATES PATENTS

| Number | Name | Date |
|---|---|---|
| 2,411,159 | Hanford | Nov. 19, 1946 |
| 2,562,547 | Hanford | July 31, 1951 |
| 2,576,837 | Irwin | Nov. 27, 1951 |

OTHER REFERENCES

Ind. and Eng. Chem. 39–333–337 (1947).
Motor Oils, by Georgi; 1950, Reinhold Pub. Co. Page 43 pertinent.